United States Patent

Husse et al.

[11] Patent Number: 5,836,432
[45] Date of Patent: Nov. 17, 1998

[54] FRICTION CLUTCH WITH A CAPTIVE PRE-LOAD SPRING AND A CAPTIVE PRE-LOAD SPRING FOR A FRICTION CLUTCH

[75] Inventors: Ulrich Husse, Schweinfurt; Karl Müller, Kronungen; Herbert Berwind, Schonungen, all of Germany

[73] Assignee: Fichtel & Sachs AG, Schweinfurt, Germany

[21] Appl. No.: 771,865

[22] Filed: Dec. 23, 1996

[30] Foreign Application Priority Data

Dec. 27, 1995 [DE] Germany .................. 195 48 859.8

[51] Int. Cl.⁶ .................................................. F16D 23/14
[52] U.S. Cl. .................. 192/70.13; 192/98; 192/DIG. 1; 384/615
[58] Field of Search .......................... 192/70.13, 89.24, 192/98, 110 B, DIG. 1; 384/615

[56] References Cited

U.S. PATENT DOCUMENTS

| | | |
|---|---|---|
| 4,660,701 | 4/1987 | Lassiaz et al. .............................. 192/98 |
| 5,295,566 | 3/1994 | Feigler et al. .............................. 192/98 |

FOREIGN PATENT DOCUMENTS

| | | |
|---|---|---|
| 0565063 | 10/1993 | European Pat. Off. . |
| 4211477 | 10/1993 | Germany ................................. 192/98 |
| 4304964 | 12/1993 | Germany . |
| 2138095 | 10/1984 | United Kingdom . |
| 2265430 | 9/1993 | United Kingdom . |

*Primary Examiner*—Richard M. Lorence
*Attorney, Agent, or Firm*—Nils H. Ljungman and Associates

[57] ABSTRACT

A friction clutch which has a release bearing and a release element with a snap connection, whereby a bias spring device is provided which is pre-installed in a separate groove in the encircling bearing ring.

18 Claims, 5 Drawing Sheets

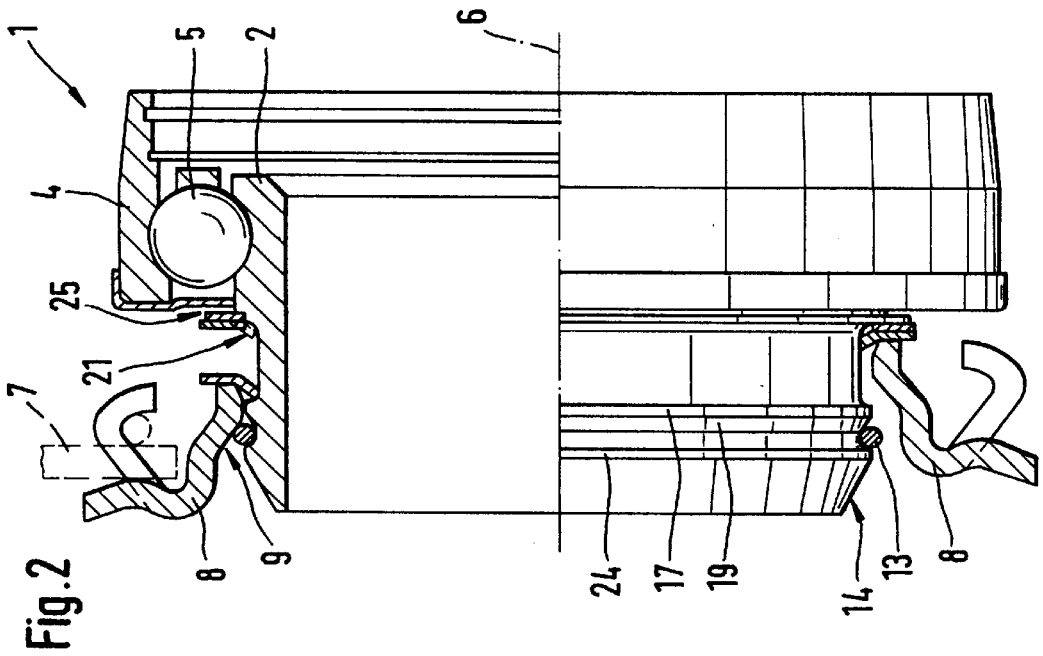
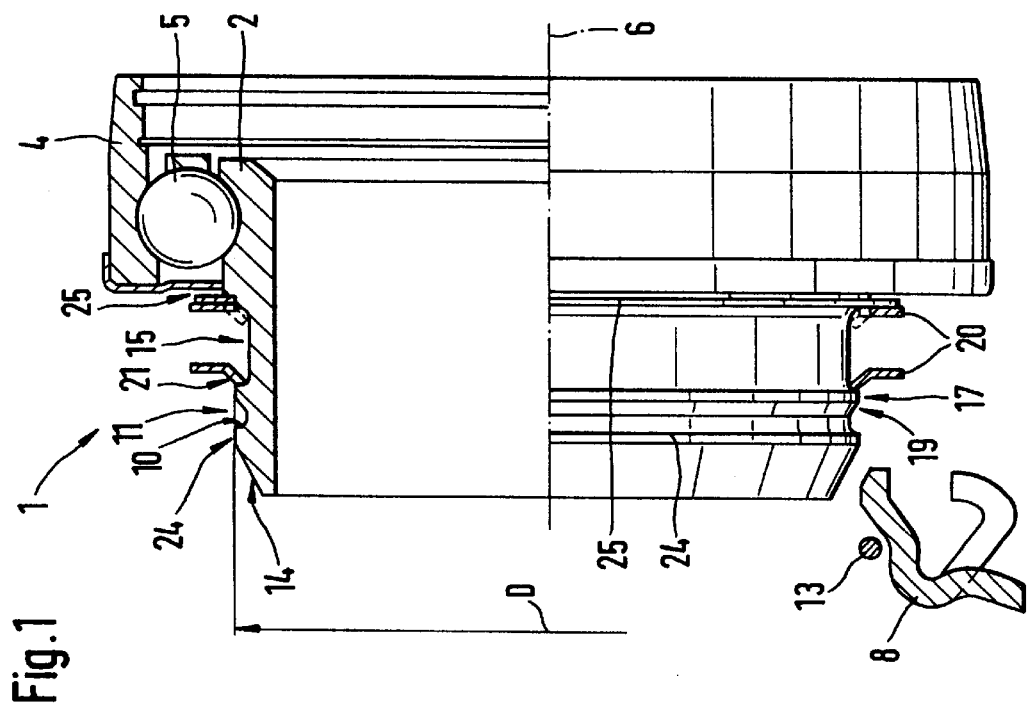

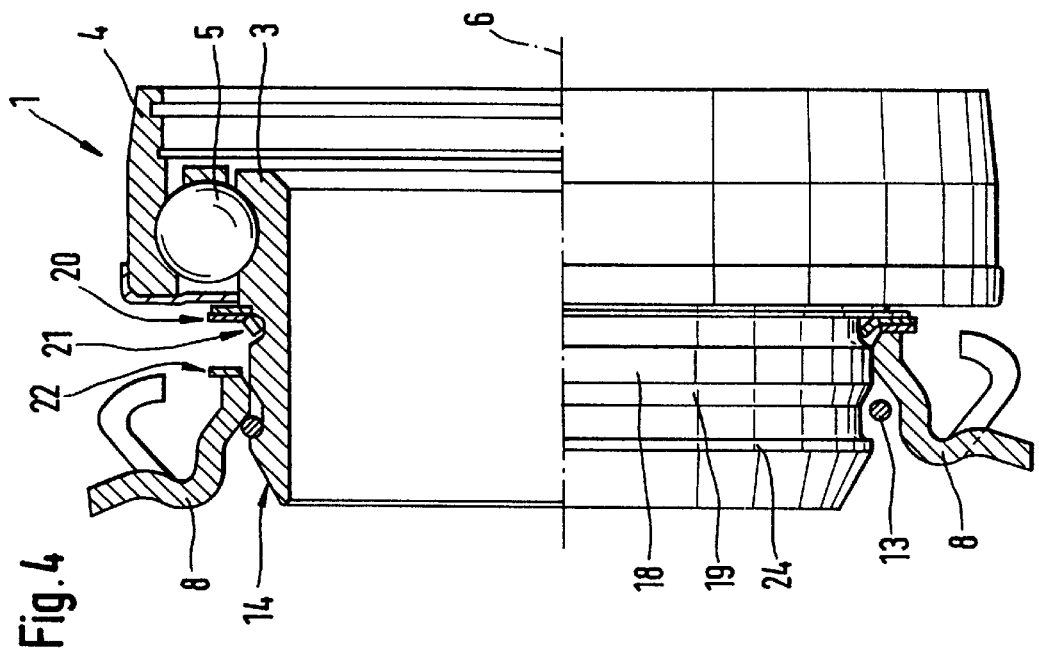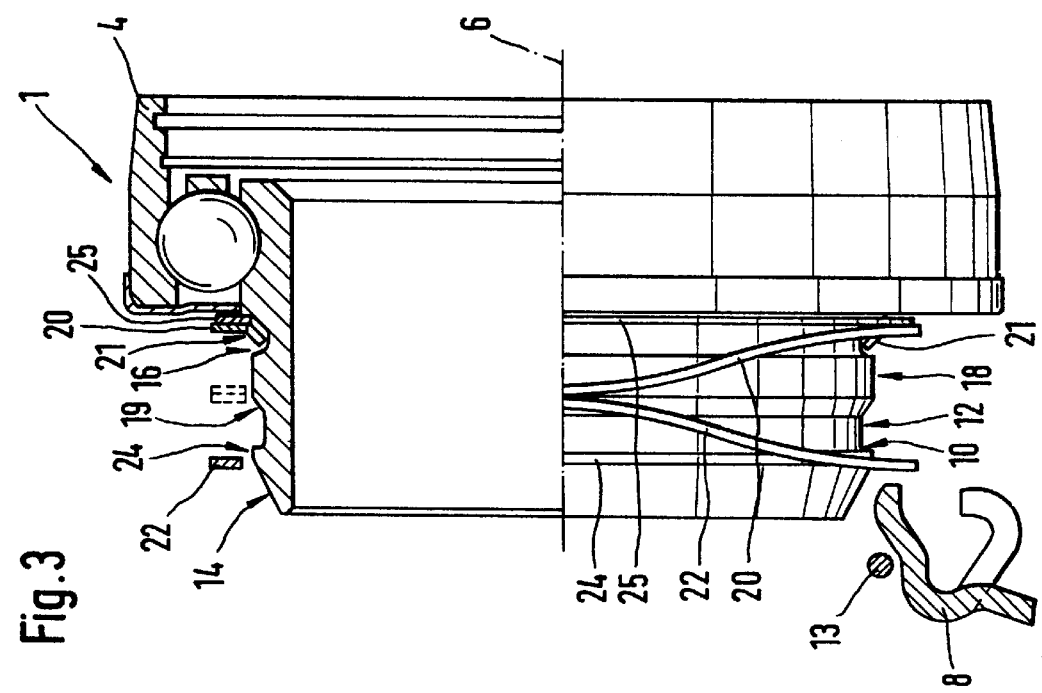

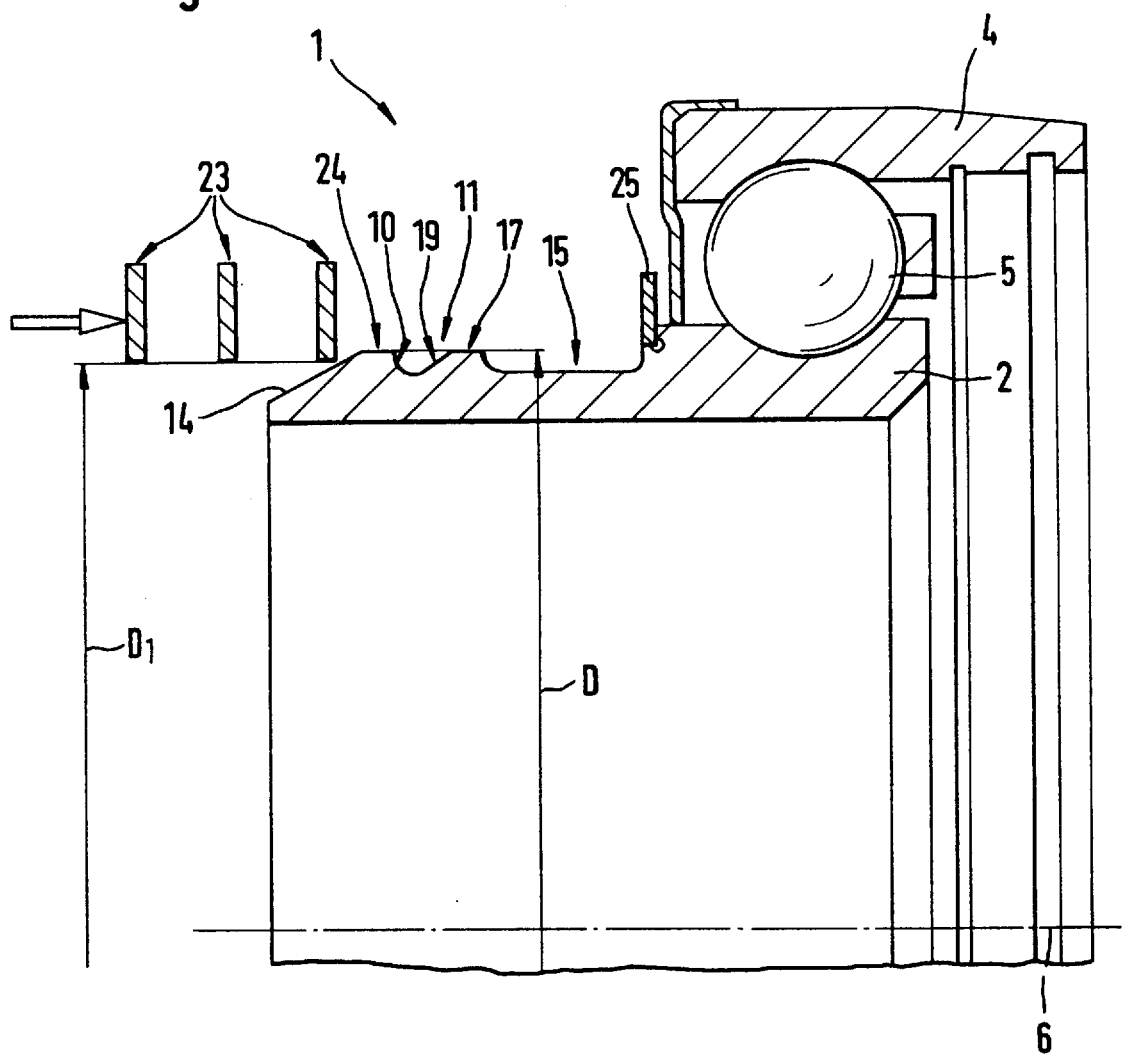

FRICTION CLUTCH WITH A CAPTIVE PRE-LOAD SPRING AND A CAPTIVE PRE-LOAD SPRING FOR A FRICTION CLUTCH

BACKGROUND OF THE INVENTION

1. Field of the Invention

This invention generally relates to a friction clutch with a release system, including a clutch housing fastened to a flywheel, an application plate which is non-rotationally located in the clutch housing but can be displaced axially, which application plate can be pushed by a spring device toward the flywheel, a clutch disc with friction linings, which clutch disc can be clamped between the application plate and the flywheel, and a clutch actuator device with a release bearing which is actuated by the driver and in which encircling bearing rings of the release bearing with its roller body track or running path can exert a pulling movement on the release elements. The release element can preferably be in the form of fingers or flexible tabs of a membrane spring. The release system also includes a connecting element which is fastened to the release elements with, located in the inner area of the connecting element, preferably an essentially conical bearing, contact or stop surface for a load ring which, together with a groove which has a mating or counter bearing surface in the encircling bearing ring, represents a snap connection. Wherein an axially acting spring device, in the operating position, applies an axial load to the connecting element substantially opposite or across from the bearing ring, such that the load ring is clamped between the bearing surface and the mating bearing surface, and the bearing ring is provided on the end farther from the roller body track with an entry bevel for the load ring.

2. Background Information

A similar known friction clutch is described, for example, in German Unexamined Patent Application 43 04 964. In this construction, adjacent to an entry bevel, a groove is located in the encircling bearing ring, in which groove an axially acting spring device is held out of the operating position, which spring device is supported on the two terminal areas of the groove which are at some axial distance from one another. The ondular washers which are used for this purpose have fingers which point diagonally away from the roller body track, which fingers are supported on the terminal area of the groove facing the entry bevel, and consequently there is a risk of damage to a support area which is simultaneously used in the operating position as a mating bearing surface for a load ring.

The bearing surface and mating bearing surface for the load ring are subjected to a great deal of stress, and are precision manufactured areas of a snap connection which determine the useful life of the snap connection.

OBJECT OF THE INVENTION

The object of the invention is therefore to significantly improve a snap connection so that the mating bearing surface for the load ring is not subjected to any uncontrolled stress caused by unsuitable components. An additional object of the invention is to achieve a simple and operationally reliable configuration and orientation or location of the spring device.

SUMMARY OF THE INVENTION

The present invention teaches that this object can be accomplished as a result of the realization of the bearing ring with two different grooves which are located axially one behind the other. The first of which groove is provided only for the location of the load ring and the second of which is located between the first groove and the roller body track and is provided for the location of a spring device with at least one spring similar to an ondular washer. Whereby the web located between the two grooves, on the side facing the groove for the load ring, can have an entry bevel for the spring device, it is possible to protect the bearing ring outside the operating position in the vicinity of the groove for the load ring against damage. The spring device is located in a separate groove, and outside the operating position is preferably held by axial internal or residual stress, as a result of which it is connected in a captive manner with the encircling bearing ring.

The present invention also teaches that the spring device can include two ondular washers which are peripherally fixed to one another, each of which has a peripherally closed spring body and a plurality of fingers which point radially inward and at an angle from the roller body track. Such a construction is relatively easy to assemble or install, because the fingers which point diagonally inward and away from the roller body track can easily be moved by elastic deformation over or across the two entry bevels for the not-yet-assembled load ring and for the groove to fix the spring device in place. As a result of the fixing of the two ondular washers with respect to one another, the invention ensures that the spring volume is essentially available to the desired extent over the entire duration of operation or useful life of the clutch.

The present invention also teaches that the spring device preferably includes an ondular washer which is realized in the form of an endless spring which has a rectangular cross section and is open on the periphery. Such an ondular washer can be manufactured very economically, since in contrast to the ondular washers which have a peripherally closed spring body and with fingers which extend radially inward, there is practically no waste generated during the manufacturing process. As a result of the peripherally open realization of such an ondular washer, it is possible to expand the spring by axial compression in the inside diameter so that it can be transported over or across the two entry bevels, and so that it is securely located in the groove.

The ondular washer, in the axially compressed state, preferably has an inside diameter which is larger than the outside diameter of the webs, and in the axially partly or fully relaxed state can have an inside diameter which is smaller than the outside diameter of the web. The spring, once installed can therefore be held in a captive manner in the corresponding groove.

The invention also teaches that the spring device can include two ondular washers which are peripherally fixed to one another, and each of which has a peripherally closed spring body, whereby only the ondular washer corresponding to the roller body track is provided with a plurality of fingers which point radially inward and diagonally away from the roller body track, and the other ondular washer has only a closed spring body. Such a construction is significantly more economical, since the ondular washer without fingers is significantly easier and more economical to manufacture.

When the word "invention" is used in this specification, the word "invention" includes "inventions", that is, the plural of "invention". By stating "invention", the Applicants do not in any way admit that the present application does not include more than one patentably and non-obviously distinct invention, and maintain that this application may include more than one patentably and non-obviously distinct invention. The Applicants hereby assert that the disclosure of this application may include more than one invention, and, in the event that there is more than one invention, that these inventions may be patentable and non-obvious one with respect to the other.

BRIEF DESCRIPTION OF THE DRAWINGS

The invention is explained in greater detail below with reference to the embodiments illustrated in the accompanying drawings, wherein:

FIGS. 1 and 2 show a partial section and a partial plan view of a release bearing with a spring device in the form of two ondular washers with fingers which point radially inward at an angle;

FIGS. 3 and 4 are a partial section and a partial plan view of two release bearings with two different ondular washers;

FIGS. 5, 6 and 7 are two partial sections through a release bearing and a plan view of an endless ondular washer.

DESCRIPTION OF THE PREFERRED EMBODIMENT

Figure 7:
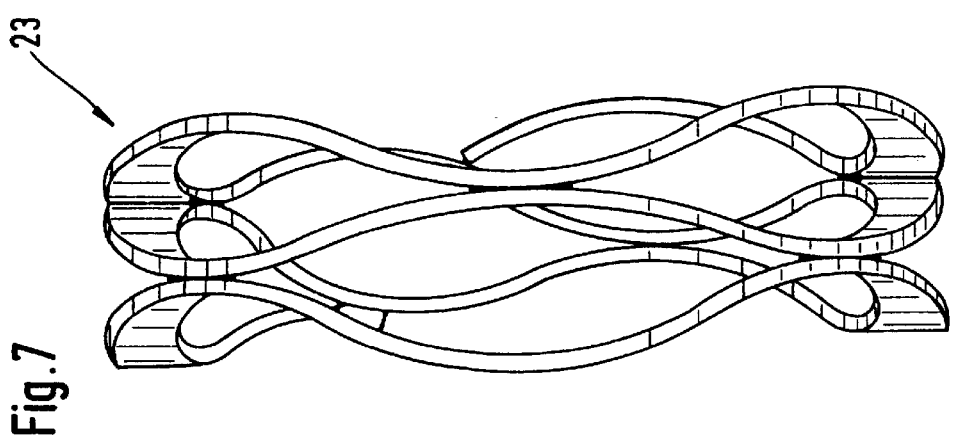

FIGS. 1 and 2 both show the same release bearing 1, whereby the sectional view in FIG. 2 shows the operating position, and the other illustrations show assembly and disassembly positions. In the operating position illustrated in the cross section view in FIG. 2, the drawing shows a release bearing 1 with a stationary outer ring 4 and an encircling inner ring 2, which are operatively connected to one another by means of roller bodies in the form of balls 5. In both bearing rings 2, 4 there are tracks for the balls 5.

The entire release bearing 1 defines an axis of rotation 6 and is thereby integrated into a friction clutch (see FIG. 8) so that the release system actuated by the driver engages the bearing ring 4 which is stationary in the peripheral direction, and the entire release bearing 1 can move to the right in the drawing to release the clutch. The bearing ring 2 can thereby revolve or rotate with the other components of the friction clutch, and the bearing ring 2 is connected to the release elements, e.g. in the form of fingers 7 of a membrane spring, by means of a connecting element 8, whereby the force transmission between the bearing ring 2 and the connecting element 8 occurs by means of a load ring 13. The load ring 13, in the operating position, is in contact with both a conical bearing surface 9 of the connecting element 8 and with a support on a mating bearing surface 10 in a groove of the bearing ring 2 (See also FIG. 1).

FIG. 1 shows the release bearing 1 with a pre-assembled or pre-installed ondular washer 20. This ondular washer 20 preferably includes two individual spring elements with a peripherally closed spring body which is ondular in the axial direction and which has fingers 21 which extend diagonally radially inward. These fingers 21 are oriented so that they point diagonally away from the roller body track of the bearing 2, and are used to secure the ondular washers 20 in a captive manner in a groove 15 of the bearing ring 2. The ondular washers 20 are assembled or installed so that they are moved over or across entry bevels 14 of a front web or portion 24 by elastic deformation of the fingers 21 toward the roller body track, pass over a groove 11 for the load ring 13, and are moved over an entry bevel 19 of a second web or portion 17 also by elastic deformation, thereby reaching the groove 15. The ondular washers 20 can then be installed in the groove 15 either axially or also can be held axially in the groove 15 by an axial residual stress. In each case the fingers 21 are engaged behind the web 17. The inside diameter of the fingers 21 in the undeformed state is smaller than the diameter D of the two webs 17 and 24. During the assembly process, the fingers 21 are expanded radially by elastic deformation until they can overcome the diameter D. The ondular washer 20 which corresponds to the roller body track of the bearing ring 2 can, when installed, be supported directly on a shoulder of the bearing ring 2, or by a stop 25, as shown in the illustration.

After the assembly or installation of the ondular washers 20, the release bearing 1 and the connecting element 8 with the release elements of the friction clutch can be installed. For this purpose, the clutch with the connecting element 8 on one hand and the release bearing 1 on the other hand are moved axially toward one another, as indicated in the lower half of FIG. 1. The load ring 13 is thereby already loosely pre-installed on the connecting element 8. The connecting element 8 has an extension which contains the conical bearing surface 9, and the inside diameter of the extension is slightly larger than the diameter D. Thus, the connecting element 8 can be threaded or guided onto the entry bevels 14, 19 over the web 24. At the maximum axial insertion as shown in the lower half of FIG. 2, the ondular washers 20 are axially compressed by the connecting element 8, while simultaneously the load ring 13 is threaded or guided over the entry bevels 14 and expanded to the diameter D, so that it can then be snapped into the groove 11. Then, the force required to introduce the two parts is neutralized and the operating position illustrated in the upper half of FIG. 2 is achieved. The ondular washers 20 expand in the axial direction and push the connecting element 8 into its operating position.

In other words, the load ring 13 is clamped without play between the bearing surface 9 of the connecting element 8 and the mating bearing surface 10 of the bearing ring 2. During operation—i.e. when the clutch is released—the load ring 13 is held in this position between the bearing surface 9 and mating bearing surface 10 by the transmission of the release force. In this operating position, the ondular washers 20 are axially prestressed, and even without the release force, hold the load ring 13 in contact without play against the bearing surface 9 and the mating bearing surface 10. The ondular washers 20 are always prestressed in the axial direction, while out of the operating position—as shown in FIG. 1—they can be either loosely inserted in the axial dimension of the groove 15 or they can also be prestressed.

As a result of this configuration, it is possible, out of the operating position, to protect the mating bearing surface 10 in the bearing ring 2 against damage, because the ondular washers 20 with their fingers 21 are supported in the groove 15. Furthermore, the assembly of such a construction is an easy procedure, because the connecting element 8 can be guided even without the application of axial force by the ondular washers 20 on the entry bevel 14 and over the web 24 and can then be threaded over the web 17. To disassemble the snap connection, as shown in the bottom half of FIG. 4, the release bearing 1 and the connecting element 8 are pushed together in the axial direction against the bias force of the ondular washers 20 until the load ring 13 lies loosely in the groove 11 and can be removed from it (by expansion by means of spring ends, not shown).

FIGS. 3 and 4 show a variant of FIGS. 1 and 2. The only differences are the realization of the spring device and the one groove in the encircling bearing ring 3. The bearing ring 3 has an entry bevel 14, adjacent to which there is a groove 12 for the load ring 13, groove 12 including the mating bearing surface 10. Between the entry bevel 14 and the mating bearing surface 10 there is a web 24. This web 24 defines the diameter D. Axially adjacent to the groove 12 there is an additional entry bevel 19 which makes a transition into a web 18. This web 18 is longer in the axial direction and ends in a groove 16, which is realized so that it can be used to locate an ondular washer 20 with the fingers 21 which begin at the closed or continuous body and run diagonally inward. This ondular washer 20 is combined with an ondular washer 22 which does not have fingers on its inside diameter, but has a closed inside diameter. The two ondular washers 20 and 22 are fastened peripherally to one another and the ondular washer 22 can be oriented in any axial direction—out of the operating position—in the relaxed state, without regard to the mating bearing surface 10 of the load ring 13. The assembly and disassembly of this snap connection is identical to that of FIGS. 1 and 2, and the other components not discussed in detail have the same identification numbers and the same function. The advantage of this construction is that only the ondular washer 20 is provided with fingers 21, while the spring 22 represents a particularly simple and economical component.

Figure 6:
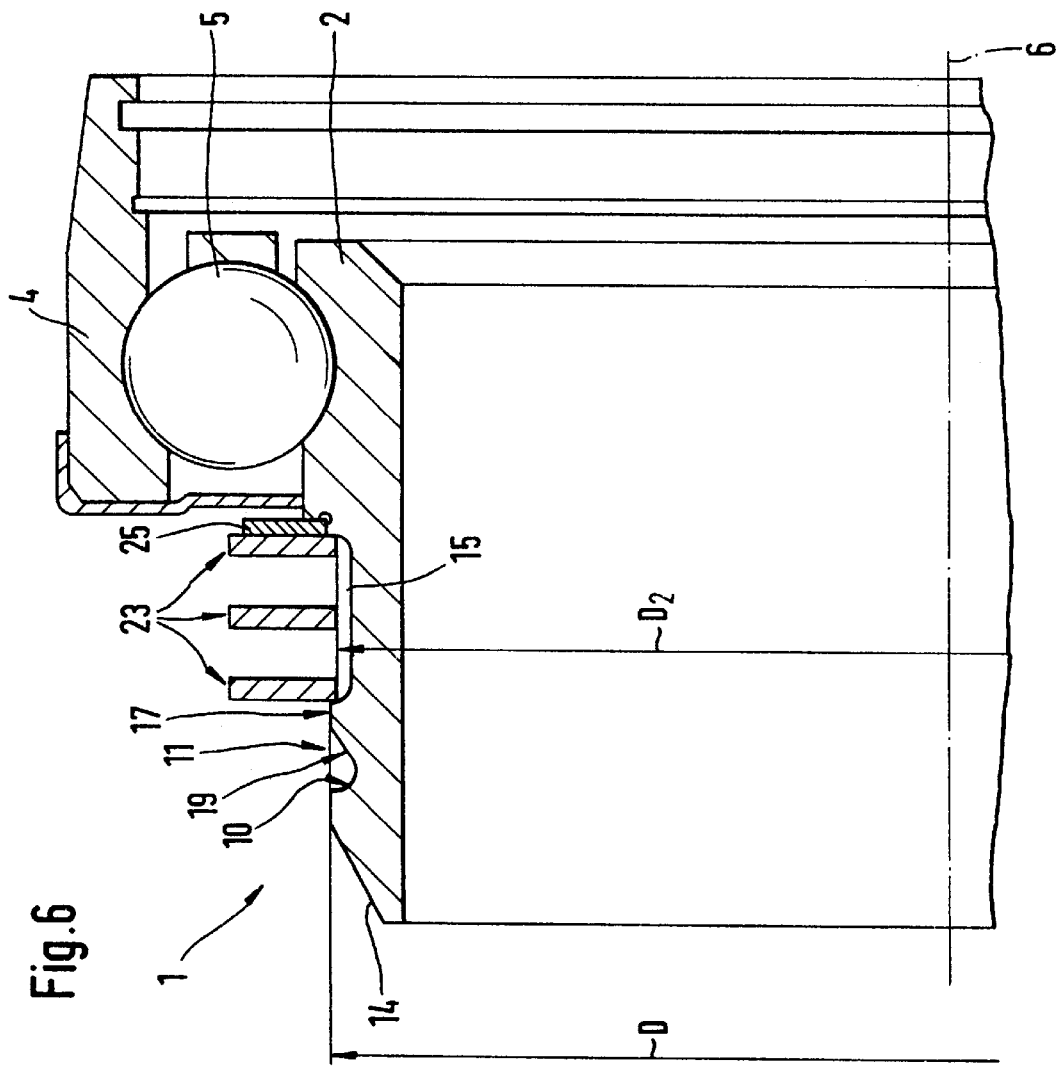

FIGS. 5 to 7 show an additional embodiment of a snap connection. In all essential details, the release bearing 1 is the same as the release bearing in FIGS. 1 and 2.

The encircling bearing ring 2, on its end farther from the roller bearing track, has an entry bevel 14 which ends in a web 24 which has the diameter D. The web 24 has a transition into a mating bearing surface 10 for the load ring 13 (not shown here). The mating bearing surface 10 is part of a groove 11 which also has an entry bevel 19 and ends in the web 17. Adjacent to the web 17 there is a groove 15 which has a relatively large axial dimension. The groove 15, viewed in the direction of the roller bearing track, ends at a stop 25 which can be realized in the form of a step in the bearing ring 2, or as an inserted ring, as shown in the drawing. Connected to the release bearing 1 is an ondular washer 23 which is shown in a plan view in FIG. 7. This ondular washer 23 is made of a flat, rectangular piece of material, and is open on the periphery (i.e. it has a beginning and an end). This type of manufacture is particularly advantageous, because no waste is generated. The ondular washer 23, as shown in FIG. 5 before its installation in the bearing ring 2, has an inside diameter D1 which is smaller than the diameter D of the webs 17 and 24. By axial compression of the individual coils of the ondular washer 23, as indicated by the arrow in FIG. 5, a more or less tight contact is created between the individual coils of the ondular washer 23, whereby the inside diameter increases from the dimension D1 in the relaxed state to the dimension D, whereupon it is possible to introduce the ondular washer 23 over the webs 24 and 17 into the groove 15. In the groove 15, the ondular washer 23 can once again relax axially, so that its inside diameter D2 becomes smaller than the diameter D, so that the ondular washer 23 is held in a captive manner in the groove 15. It is thereby unimportant whether, out of the operating position, the ondular washer 23 is located axially loosely or under an axial bias in the groove 15. The mating bearing surface 10 of the groove 11 is not contacted during this installation process, so that during the subsequent assembly of the snap connection—as discussed in connection with FIGS. 1 to 4, the load ring 13 can come into contact with an undamaged mating bearing surface 10. In that case, a connecting element 8 as illustrated in FIGS. 1 to 4 can be used.

Figure 8:
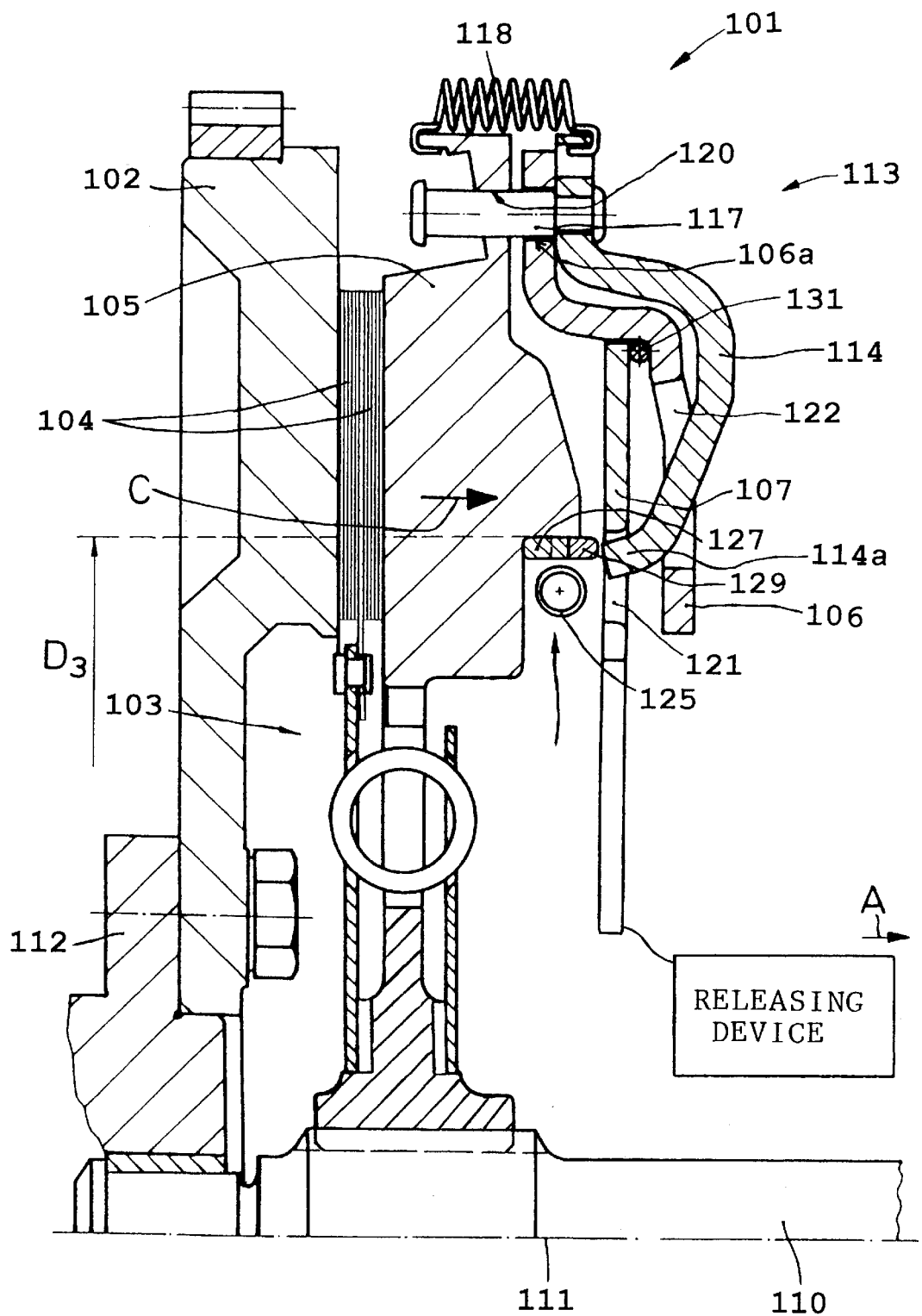
FIG. 8 shows the upper half of an axial section through a complete friction clutch with which the present invention could be utilized.

FIG. 8 shows a friction clutch 101 with which the present invention could be utilized. FIG. 8 shows a friction clutch 101 with a flywheel 102, which flywheel 102 is preferably fastened to the crankshaft 112 of an internal combustion engine. The flywheel 102 preferably rotates together with the crankshaft 112, around the axis of rotation 111. In conjunction with the flywheel 102 there is a clutch housing 106, which preferably encloses the clutch disc 103, the pressure plate 105 and the membrane spring 107. The pressure plate 105 is preferably mounted in a manner not illustrated in any further detail but generally in a manner known in the art, on the clutch housing 106 so that it is preferably torsionally stationary, but can move axially. The orientation of the membrane spring 107 is the orientation preferably found in a "pulled" friction clutch or friction clutch under tension, whereby the outside diameter of the membrane spring 107 is preferably in contact with the clutch housing 106, preferably by means of a wire ring 131. Further, a central area of the membrane spring 107 preferably exerts an axially-directed force on the pressure plate 105, to clamp the friction lining 104 of the clutch disc 103 between the pressure plate 105 and the flywheel 102, thereby engaging the clutch 101. Thus, the clutch disc 103 is preferably mounted so that the clutch disc 103 is essentially torsionally stationary, but preferably axially movable on the transmission shaft 110.

In the disengaged position of the friction clutch 101, a biasing force is preferably transmitted from the membrane spring 107 to the pressure plate 105 by means of a ring element, which ring element is preferably radially guided on a guide diameter $D_1$ of the pressure plate 105. The ring element is preferably comprised of two coaxial rings 127 and 129. If an adjustment is needed due to the wearing of the friction linings 104, the two rings 127 and 129 are preferably pulled toward one another, at least by a tension spring 125, in the circumferential direction with a force which preferably twists the two rings 127 and 129 in opposite directions, thus preferably increasing the axial space occupied by the two rings 127 and 129.

A releasing device which could include the instant invention is schematically shown. In this embodiment, this releasing device is preferably moved in the direction of the Arrow A to disengage the friction clutch 101. When the friction clutch 101 is released or disengaged, corresponding to the movement A of the releasing device to the right, the membrane spring 107 is preferably tipped or pivoted with respect to the wire ring 131, and the clamping force on the friction linings 104 is released, and the clutch 101 is preferably disengaged. As a result of an aerodynamic force, or possibly a releasing force which preferably acts on the pressure plate 105 in the direction indicated by Arrow C, the pressure plate 105 is preferably held by means of the two rings 127 and 129 in contact with the central area of the membrane spring 107, and the ring 129 is preferably simultaneously in contact with the sensing lever 114 of a clearance sensor 113. This aerodynamic force or releasing force which preferably acts on the pressure plate in the direction indicated by Arrow C, could possibly come about as a result of the absence of the force of the membrane spring 107. The other ring 127, viewed in the axial direction, is preferably in contact with a surrounding or circular portion of the pressure plate 105. Both rings 127 and 129 are preferably fixed in the radial direction by the guide diameter $D_3$ of the pressure plate 105.

During the disengagement process, there can preferably be several clearance sensors 113 distributed about the circumference of the clutch housing 106, or possibly distributed over the circumference of the pressure plate 105. During the disengagement process, the clearance sensors 113 preferably move to the right along with the pressure plate 105. Each sensing lever 114 preferably has a sliding bolt 117, the axis of which sliding bolt 117 preferably extends in a parallel direction with respect to the axis of rotation 111. The sliding bolt 117 preferably extends through the pressure plate 105 in a hole 120. In this hole 120, the bolt 117 is preferably fixed during this process by jamming, or possibly by tilting, preferably to frictionally maintain the bolt 117 in a substantially fixed position during normal operation. The jamming of the sliding bolt 117 is preferably assisted by means of respective tension springs 118. The sliding bolt 117 thereby preferably extends with sufficient play through a corresponding opening 106a in the clutch housing 106. The tension springs 118 can preferably be disposed to "twist" the clutch housing 106 relative to the pressure plate 105, to essentially misalign holes 120 and 106a. The sensing lever 114 also preferably runs radially inside the sliding bolt 117, and through the clutch housing 106 in an opening 122. Thus, the bolt 117 can conceivably have a slot or opening through which the sensing lever 114 can extend. The sensing lever 114 also preferably extends through the membrane spring 107 by means of an opening 121. The end 114a of the sensing lever 114 is preferably in direct contact with the ring 129.

It should be understood that the friction clutch 101 shown in FIG. 8 is presented only by way of example of one type of clutch in which the present invention may be incorporated.

One feature of the invention resides broadly in the friction clutch with a release system, comprising a clutch housing fastened to a flywheel, an application plate which is non-rotationally located in the clutch housing but can be displaced axially, which application plate can be pushed by a spring device toward the flywheel, a clutch disc with friction linings, which clutch disc can be clamped between the application plate and the flywheel, a clutch actuator device with a release bearing 1 which is actuated by the driver and in which encircling bearing rings 2, 3 of the release bearing 1 with its roller body track or running path or race can exert a pulling movement on the release elements which are preferably in the form of fingers or flexible tabs of a membrane spring, also comprising a connecting element 8 which is fastened to the release elements with, located in the inner area of the connecting element 8, preferably an essentially conical bearing, contact or stop surface 9 for a load ring 13 which, together with a groove 11, 12 which has a mating or counter bearing surface 10 in the encircling bearing ring 2, 3 represents a snap connection, and whereby an axially acting spring device, in the operating position, applies an axial load to the connecting element 8 opposite or across from the bearing ring 2, 3, such that the load ring 13 is clamped between the bearing surface 9 and the mating bearing surface 10, and the bearing ring 2, 3 is provided on the end farther from the roller body or roller track with an entry bevel 14 for the load ring 13, characterized by the fact that the bearing ring 2, 3 has two different grooves 11, 12, 15, 16 one axially behind the other, the first 11, 12 of which is provided only for the location of the load ring 13 and the second of which 15, 16 is located between the first groove and the roller body track for the location of a spring device 20, 22, 23 which has at least one spring similar to an ondular washer, and the web 17, 18 located between the two grooves, on the side facing the groove 11, 12 for the load ring 13, has an entry bevel 19 for the spring device.

Another feature of the invention resides broadly in the friction clutch characterized by the fact that the spring device consists of, for example, two ondular washers 20 which are peripherally fixed to one another, each with a peripherally closed spring body and with a plurality of fingers 21 pointing radially inward and at an angle away from the roller body track.

Yet another feature of the invention resides broadly in the friction clutch characterized by the fact that the spring device preferably consists of an ondular washer 23 which is realized in the form of an endless spring which has a rectangular cross section and is peripherally open.

Still another feature of the invention resides broadly in the friction clutch characterized by the fact that the ondular washer, in the axially compressed state, has an inside diameter which is larger than the outside diameter D of the webs 17, 24, and in the axially partly or completely relaxed state has an inside diameter D2 which is smaller than the outside diameter of the web 24.

A further feature of the invention resides broadly in the friction clutch characterized by the fact that the spring device consists of two ondular washers 20, 22 which are peripherally fixed to one another, each with a peripherally closed spring body, whereby only the ondular washer 20 which corresponds to the roller body track is provided with a plurality of fingers 21 which point radially inward and diagonally away from the roller body track.

Examples of clutches may be found in the following documents: U.S. Pat. No. 5,476,166; U.S. patent application Ser. No. 08/360,455 filed on Dec. 21, 1994 entitled "FRICTION CLUTCH FOR A MOTOR VEHICLE"; U.S. patent application Ser. No. 08/405,139 filed on Mar. 16, 1995 entitled "A MOTOR VEHICLE MANUAL TRANSMISSION WITH A CLUTCH WHICH CLUTCH HAS A FASTENING STRUCTURE FOR FASTENING THE LINING SPRING SEGMENTS TO THE DRIVING PLATE"; U.S. patent application Ser. No. 08/438,709 filed on May 11, 1995 entitled "CLUTCH ASSEMBLY FOR A MOTOR VEHICLE HAVING A FLEXIBLE CLUTCH DISC"; U.S. patent application Ser. No. 08/499,305 filed on Jul. 7, 1995 entitled "CLUTCH DISC OF A MOTOR VEHICLE, WHICH CLUTCH DISC HAS AN ELASTIC CONNECTION BETWEEN THE CARRIER PLATE & RUB"; U.S. patent application Ser. No. 08/502,401 filed on Jul. 14, 1995 entitled "A TRANSMISSION OF AN INTERNAL COMBUSTION ENGINE WITH A CLUTCH WITH A TWO-MASS FLYWHEEL"; U.S. patent application Ser. No. 08/504,848 filed on Jul. 20, 1995 entitled "AIR-COOLED FLYWHEEL & A FRICTION CLUTCH FOR A TRANSMISSION OF A MOTOR VEHICLE, THE FLYWHEEL HAVING TWO CENTRIFUGAL MASSES"; U.S. patent application Ser. No. 08/515,263 filed on Aug. 15, 1995 entitled "A FLYWHEEL FOR THE FRICTION CLUTCH OF A MOTOR VEHICLE, THE FLYWHEEL HAVING TWO CENTRIFUGAL MASSES & A FRICTION DEVICE"; U.S. patent application Ser. No. 08/515,348 filed on Aug. 15, 1995 entitled "FRICTION CLUTCH FOR THE TRANSMISSION OF A MOTOR VEHICLE & A FLYWHEEL ASSEMBLY FOR A FRICTION CLUTCH"; and U.S. patent application Ser. No. 08/518,789 filed on Aug. 23, 1995 entitled "FRICTION CLUTCH ASSEMBLY FOR A MOTOR VEHICLE, THE FRICTION CLUTCH ASSEMBLY HAVING A CLUTCH PLATE WITH DIVIDED HUB DISC". These patents and patent applications and their corresponding published patent applications, as well as their published equivalents, and other equivalents or corresponding applications, if any, and the references cited in any of the documents, publications, patents, and published patent applications cited herein, are hereby incorporated by reference as if set forth in their entirety herein. All of the above U.S. patent documents in this paragraph are assigned to Fichtel & Sachs AG of the Federal Republic of Germany.

Some examples of clutch assemblies and various components associated therewith which could possibly utilize the present invention, may be disclosed in the following U.S. Patents: U.S. Pat. No. 4,684,007 to Maucher, entitled "Clutch Plate"; U.S. Pat. No. 4,635,780 to Wiggen, entitled "Clutch Disc for a Motor Vehicle Friction Clutch"; U.S. Pat. No. 4,651,857 to Schraut et al., entitled "Clutch Disc Unit for a Motor Vehicle Friction Clutch"; U.S. Pat. No. 5,103,688 to Kuhne, entitled "Two-mass Flywheel"; and U.S. Pat. No. 4,777,843 to Bopp, entitled "Two-mass Flywheel Assembly With Viscous Damping Assembly".

Examples of release bearing assemblies that may be used, or components of which may be used, in conjunction with at least one embodiment of the present invention may be found in: U.S. Pat. No. 5,400,886, issued Mar. 28, 1995; U.S. Pat. No. 5,423,405, issued Jun. 13, 1995; and U.S. Pat. No. 5,443,143, issued Aug. 22, 1995.

Examples of ondular washers and/or spring washers which may possibly be used in conjunction with at least one embodiment of the present invention may be found in the following U.S. Patents: U.S. Pat. No. 5,383,772; U.S. Pat. No. 5,385,224; U.S. Pat. No. 5,400,887; and U.S. Pat. No. 5,401,213.

The components disclosed in the various publications, disclosed or incorporated by reference herein, may be used in the embodiments of the present invention, as well as, equivalents thereof.

The appended drawings in their entirety, including all dimensions, proportions and/or shapes in at least one embodiment of the invention, are accurate and to scale and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication applications, namely, Federal Republic of Germany Patent Application No. 195 48 859.8, filed on Dec. 27, 1995, having inventors Ulrich Husse, Karl Müller, and Herbert Berwind, and DE-OS 195 48 859.8 and DE-PS 195 48 859.8 are hereby incorporated by reference as if set forth in their entirety herein.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clause are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A friction clutch assembly for a motor vehicle, said clutch assembly comprising:

a flywheel defining an axis of rotation and an axial direction parallel to the axis of rotation;

a clutch disc;

a pressure plate;

said clutch disc being disposed between said flywheel and said pressure plate;

a biasing device to apply an axially directed force to said pressure plate to engage said clutch disc with said flywheel;

said clutch disc comprising at least one friction lining for contacting said pressure plate and said flywheel during engagement of said clutch disc with said flywheel;

apparatus for actuating said clutch disc;

said actuating apparatus comprising:

a release bearing;

said release bearing comprising a first end and a second end disposed along said axis of rotation;

said first end comprising a substantially ring-shaped portion;

said substantially ring-shaped portion being disposed adjacent said biasing device;

a connecting element to connect said release bearing with said biasing device;

said connecting element having a first end connected to said biasing device;

said connecting element having a second end connected to said substantially ring-shaped portion;

said substantially ring-shaped portion comprising an outer surface;

said outer surface facing away from said axis of rotation;

said outer surface comprising a first annular groove and a second annular groove disposed adjacent to one another;

a substantially ring-shaped element disposed in said first annular groove;

a spring device disposed at least in part in said second annular groove;

said spring device being configured to apply an axial bias to said connecting element;

said connecting element having a surface area substantially facing said substantially ring-shaped portion;

said substantially ring-shaped element being held between a portion of said surface area of said connecting element and at least a portion of said first annular groove;

said spring device comprising at least one washer having an undulating shape;

said outer surface of said substantially ring-shaped portion comprising a web portion;

said web portion being disposed between said first annular groove and said second annular groove;

said web portion having an outside diameter dimension;

said at least one washer having a first inside diameter dimension upon being disposed at least in part in said second annular groove;

said at least one washer being configured to permit axial compression of said at least one washer upon assembly of said clutch assembly;

said at least one washer having a second inside diameter dimension in said compressed state;

said first inside diameter dimension of said at least one washer being smaller than said outside diameter dimension of said web portion; and said second inside diameter dimension of said at least one washer being larger than said outside diameter of said web portion, to permit assembly of said clutch assembly.

2. The friction clutch assembly according to claim 1, wherein:

said outer surface of said substantially ring-shaped portion comprises an extreme end disposed adjacent said biasing device;

said extreme end comprises a first bevelled portion;

said first annular groove being disposed adjacent said first bevelled portion;

a portion of said first annular groove comprising a second bevelled portion; and said second bevelled portion being disposed immediately adjacent said web portion.

3. The friction clutch assembly according to claim 2, wherein:

said biasing device comprises a membrane spring;

said membrane spring comprises a plurality of flexible tab portions extending radially inward;

at least one of said flexible tab portions being connected to said connecting element; and said release bearing being disposed and configured to exert a pulling force on said at least one flexible tab.

4. The friction clutch assembly according to claim 3, wherein:

said at least one washer comprises two washers each having undulating shapes;

said two washers each comprising a periphery;

said two washers being attached to one another at said peripheries;

each of said two washers comprises a spring body configured to be closed on each said periphery; and each of said peripheries comprises a plurality of fingers extending radially inward at an angle in a direction toward said friction clutch.

5. The friction clutch assembly according to claim 3, wherein:

said at least one washer is configured as an endless spring;

said endless spring having a cross-section dimension;

said cross-section dimension having a rectangular shape;

said endless spring comprises a periphery; and said periphery is configured to be open.

6. The friction clutch assembly according to claim 5, wherein:

said outer surface of said substantially ring-shaped portion comprises an additional web portion;

said additional web portion being disposed between said first bevelled portion and said first annular groove;

said additional web portion has a second outside diameter dimension;

said first inside diameter dimension of said at least one washer being smaller than said second outside diameter dimension of said additional web portion; and said second inside diameter dimension of said at least one washer being larger than said second outside diameter dimension of said additional web portion, to permit assembly of said clutch assembly.

7. The friction clutch assembly according to claim 3, wherein:

said at least one washer comprises two washers each having undulating shapes;

said two washers each comprising a periphery;

said two washers being attached to one another at said peripheries;

each of said two washers comprises a spring body configured to be closed on each said periphery;

said release bearing comprises an outer substantially ring-shaped member disposed at a first radial distance from said azis of rotation, and an inner substantially ring-shaped member disposed at a second radial distance from said axis of rotation;

said first radial distance being greater than said second radial distance; and said inner substantially ring-shaped member comprises said substantially ring-shaped portion;

said release bearing comprises at least one roller body;

a portion of said outer substantially ring-shaped member and a portion of said inner substantially ring-shaped member being disposed to define a roller body track;

said at least one roller body being disposed in said roller body track;

said second annular groove being disposed adjacent said roller body track;

one of said two washers being disposed to be closer to said roller body track than the other of said two washers; and said washer disposed closer to said roller body track comprises a plurality of fingers extending radially inward at an angle in a direction away from said roller body track.

8. The friction clutch assembly according to claim 6, wherein:

said substantially ring-shaped element comprises a load ring;

said portion of said surface area of said connecting element comprises a first surface area for contacting said load ring;

said first surface area being substantially conical;

said at least a portion of said first annular groove comprises a second surface area for contacting said load ring;

said second surface area for contacting said load ring being disposed substantially opposite said first surface area; and said first and said second surface areas being configured and disposed to clamp said load ring between said first and second surface areas.

9. The friction clutch assembly according to claim 7, wherein:

said substantially ring-shaped portion, said spring device, said substantially ring-shaped element and said connecting element together form a snap connection to connect said release bearing to said connecting element;

said actuating apparatus comprises a stop element disposed adjacent said roller body track; and said stop element being configured and disposed to contact said washer disposed closer to said roller body track.

10. An actuator assembly for a friction clutch having a biasing device, said actuator assembly comprising:

a release bearing;

said release bearing defining a longitudinal axis and an axial direction parallel to said longitudinal axis;

said release bearing comprising a first end and a second end disposed along said longitudinal axis;

said first end comprising a substantially ring-shaped portion;

said substantially ring-shaped portion being configured to be disposed adjacent the biasing device;

a connecting element configured to connect said release bearing with the biasing device;

said connecting element having a first end configured to be connected to the biasing device;

said connecting element having a second end connected to said substantially ring-shaped portion;

said substantially ring-shaped portion comprising an outer surface disposed away from the longitudinal axis;

said outer surface comprising a first annular groove and a second annular groove disposed adjacent to one another;

a substantially ring-shaped element disposed in said first annular groove;

a spring device disposed at least in part in said second annular groove;

said spring device being configured to apply an axial bias to said connecting element;

said connecting element having a surface area substantially facing said substantially ring-shaped portion;

said substantially ring-shaped element being held between a portion of said surface area of said connecting element and at least a portion of said first annular groove; and said spring device comprising at least one washer having an undulating shape.

11. The actuator assembly according to claim 10, wherein:

said outer surface of said substantially ring-shaped portion comprises an extreme end disposed adjacent the biasing device;

said extreme end comprises a first bevelled portion;

said first annular groove being disposed adjacent said first bevelled portion;

said outer surface of said substantially ring-shaped portion comprises a web portion;

said web portion being disposed between said first annular groove and said second annular groove;

a portion of said first annular groove comprising a second bevelled portion; and said second bevelled portion being disposed immediately adjacent said web portion.

12. The actuator assembly according to claim 11, wherein the biasing device of the friction clutch comprises a membrane spring; the membrane spring comprises a plurality of flexible tab portions extending radially inward; and wherein:

said substantially ring-shaped portion is configured to be connected to at least one of the flexible tab portions; and said release bearing is configured to exert a pulling force on the at least one of the flexible tab portions.

13. The actuator assembly according to claim 12, wherein:

said at least one washer comprises two washers each having undulating shapes;

said two washers each comprising a periphery;

said two washers being attached to one another at said peripheries;

each of said two washers comprises a spring body configured to be closed on each said periphery; and each of said peripheries comprises a plurality of fingers;

said plurality of fingers being configured to be disposed to extend radially inward at an angle in a direction toward the friction clutch.

14. The actuator assembly according to claim 12, wherein:

said at least one washer is configured as an endless spring;

said endless spring having a cross-section dimension;

said cross-section dimension having a rectangular shape;

said endless spring comprises a periphery; and said periphery is configured to be open.

15. The actuator assembly according to claim 14, wherein:

said at least one washer has a first inside diameter dimension upon being disposed at least in part in said second annular groove;

said at least one washer is configured to permit axial compression of said at least one washer upon assembly of said clutch assembly;

said at least one washer has a second inside diameter dimension in said compressed state;

said outer surface of said substantially ring-shaped portion comprises an additional web portion;

said additional web portion being disposed between said first bevelled portion and said first annular groove;

said web portion has a first outside diameter dimension;

said additional web portion has a second outside diameter dimension;

said first inside diameter dimension of said at least one washer being smaller than said first outside diameter dimension of said web portion and said second outside diameter dimension of said additional web portion; and said second inside diameter dimension of said at least one washer being larger than said first outside diameter dimension of said web portion and said second outside diameter dimension of said additional web portion, to permit assembly of said actuator assembly.

16. The actuator assembly according to claim 12, wherein:

said at least one washer comprises two washers each having undulating shapes;

said two washers each comprising a periphery;

said two washers being attached to one another at said peripheries;

each of said two washers comprises a spring body configured to be closed on each said periphery;

said release bearing comprises an outer substantially ring-shaped member disposed at a first radial distance from said longitudinal axis, and an inner substantially ring-shaped member disposed at a second radial distance from said longitudinal axis;

said first radial distance being greater than said second radial distance; and said inner substantially ring-shaped member comprises said substantially ring-shaped portion;

said release bearing comprises at least one roller body;

a portion of said outer substantially ring-shaped member and a portion of said inner substantially ring-shaped member being disposed to define a roller body track;

said at least one roller body being disposed in said roller body track;

said second annular groove being disposed adjacent said roller body track;

one of said two washers being disposed to be closer to said roller body track than the other of said two washers; and said washer disposed closer to said roller body track comprises a plurality of fingers extending radially inward at an angle in a direction away from said roller body track.

17. The actuator assembly according to claim 15, wherein:

said substantially ring-shaped element comprises a load ring;

said portion of said surface area of said connecting element comprises a first surface area for contacting said load ring;

said first surface area being substantially conical;

said at least a portion of said first annular groove comprises a second surface area for contacting said load ring;

said second surface area for contacting said load ring being disposed substantially opposite said first surface area;

said first and said second surface areas being disposed to clamp said load ring between said first and said second surface areas;

said substantially ring-shaped portion, said spring device, said substantially ring-shaped element and said connecting element together form a snap connection to connect said release bearing to said connecting element;

said actuating apparatus comprises a stop element disposed adjacent said second annular groove; and said stop element being configured and disposed to contact said spring device.

18. A bearing for actuating and deactuating an apparatus having a biasing device, said bearing comprising:

a first end and a second end;

a longitudinal axis being disposed to join said first end and said second end;

said first end comprising a substantially ring-shaped portion;

said substantially ring-shaped portion being configured to be disposed adjacent a biasing device;

said substantially ring-shaped portion being configured to be disposed adjacent a connecting element, which connecting element is configured to connect said substantially ring-shaped portion with a biasing device;

said substantially ring-shaped portion comprising an outer surface facing away from the longitudinal axis;

said outer surface comprising a first annular groove and a second annular groove disposed adjacent to one another;

a substantially ring-shaped element disposed in said first annular groove;

a spring device disposed at least in part in said second annular groove;

said spring device being configured to apply an axial bias to a connecting element;

said substantially ring-shaped element being configured and disposed to be held between a portion of a connecting element and at least a portion of said first annular groove upon connection of said bearing to a biasing device;

said spring device comprising at least one washer having an undulating shape;

said outer surface of said substantially ring-shaped portion comprising a web portion;

said web portion being disposed between said first annular groove and said second annular groove;

said web portion having an outside diameter dimension;

said at least one washer having a first inside diameter dimension upon being disposed at least in part in said second annular groove;

said at least one washer being configured to permit axial compression of said at least one washer upon assembly of said clutch assembly;

said at least one washer having a second inside diameter dimension in said compressed state;

said first inside diameter dimension of said at least one washer being smaller than said outside diameter dimension of said web portion; and said second inside diameter dimension of said at least one washer being larger than said outside diameter of said web portion, to permit assembly of said bearing.

* * * * *

UNITED STATES PATENT AND TRADEMARK OFFICE
CERTIFICATE OF CORRECTION

PATENT NO.   : 5,836,432
DATED        : November 17, 1998
INVENTOR(S)  : Ulrich HUSSE, Karl MÜLLER, and Herbert BERWIND It is certified that error appears in the above-identified patent and that said Letters Patent is hereby corrected as shown below:

In Column 8, line 38, after 'PLATE &' delete "RUB";" and substitute therefor --"HUB";--.

In Column 12, line 5, Claim 7, after 'said', delete "azis" and substitute therefore --axis--.

Signed and Sealed this

Twenty-fourth Day of August, 1999

Attest:

Q. TODD DICKINSON

*Attesting Officer*     Acting Commissioner of Patents and Trademarks